United States Patent
Llorenty et al.

(10) Patent No.: US 11,884,310 B2
(45) Date of Patent: *Jan. 30, 2024

(54) SYSTEMS AND METHODS FOR DETECTING TANKS IN RAILWAY ENVIRONMENTS

(71) Applicant: BNSF Railway Company, Fort Worth, TX (US)

(72) Inventors: Andrea Leticia Arias Llorenty, Fort Worth, TX (US); Sandra N. Green, Arlington, TX (US); Rucha D. Jani, Fort Worth, TX (US); David Matthew King, Fort Worth, TX (US); Doug McReynolds, Dallas, TX (US); Seyed Mohammad Nourbakhsh, Keller, TX (US); Stephanie Ortiz Watkins, Krum, TX (US); Nathaniel Richmond, Frisco, TX (US); Xiaoyan Si, Kirkland, WA (US); Je Sang Sung, Fort Worth, TX (US); Anpeng Zhang, Seattle, WA (US)

(73) Assignee: BNSF Railway Company, Fort Worth, TX (US)

( * ) Notice: Subject to any disclaimer, the term of this patent is extended or adjusted under 35 U.S.C. 154(b) by 193 days.

This patent is subject to a terminal disclaimer.

(21) Appl. No.: 17/176,131

(22) Filed: Feb. 15, 2021

(65) Prior Publication Data

US 2021/0331723 A1    Oct. 28, 2021

Related U.S. Application Data

(63) Continuation of application No. 16/855,365, filed on Apr. 22, 2020, now Pat. No. 10,919,546.

(51) Int. Cl.
*B61K 9/08* (2006.01)
*B61L 23/04* (2006.01)
*B61L 25/02* (2006.01)

(52) U.S. Cl.
CPC .............. *B61K 9/08* (2013.01); *B61L 23/041* (2013.01); *B60L 2200/26* (2013.01); (Continued)

(58) Field of Classification Search
CPC ....... B61K 9/08; B61L 23/041; B61L 23/047; B61L 25/025; B61L 2205/04; B60L 2200/26

See application file for complete search history.

(56) References Cited

U.S. PATENT DOCUMENTS 5,008,661 A * 4/1991 Raj .......................... G07C 9/28
340/10.33
7,999,848 B2   8/2011 Chew
(Continued)

FOREIGN PATENT DOCUMENTS

| AU | 2017232220 A1 | 4/2019 |
| JP | 2019188846 A | 10/2019 |
| JP | 2020005464 A | 1/2020 |
| WO | 2018104462 A1 | 6/2018 |
| WO | 2018073778 A9 | 4/2019 |

OTHER PUBLICATIONS

Patent Cooperation Treaty, International Search Report & Written Opinion, International Application No. PCT/US2021/024594, dated Jul. 9, 2021, 18 pages.

*Primary Examiner* — Tarek Elarabi
(74) *Attorney, Agent, or Firm* — Whitaker Chalk Swindle & Schwartz, PLLC; Enrique Sanchez, Jr.

(57) ABSTRACT

In one embodiment, a method includes identifying, by an image detection tool, a tank within an image of a railway environment and identifying, by the image detection tool, a railroad track within the image of the railway environment. The method also includes determining, by the image detection tool, a distance between the tank and the railroad track and comparing, by the image detection tool, the distance between the tank and the railroad track to a predetermined threshold distance. The method further includes determin- (Continued)

ing, by the image detection tool, that the tank presents a hazard to the railway environment in response to comparing the distance between the tank and the railroad track to the predetermined threshold distance.

20 Claims, 4 Drawing Sheets

(52) U.S. Cl.
CPC ........... *B61L 23/047* (2013.01); *B61L 25/025* (2013.01); *B61L 2205/04* (2013.01)

(56) References Cited

U.S. PATENT DOCUMENTS

| | | | |
|---|---|---|---|
| 8,229,170 B2 | 7/2012 | Sebastian et al. | |
| 9,224,049 B2 | 12/2015 | Feris et al. | |
| 10,654,499 B2* | 5/2020 | Katz | B61L 23/041 |
| 10,919,546 B1* | 2/2021 | Llorenty | B61K 9/08 |
| 2016/0152253 A1 | 6/2016 | Katz et al. | |
| 2018/0297621 A1* | 10/2018 | Matson | B61L 23/041 |
| 2018/0370552 A1 | 12/2018 | Puttagunta et al. | |
| 2019/0329806 A1* | 10/2019 | Anderson | B61L 23/04 |
| 2019/0367059 A1 | 12/2019 | Matson et al. | |
| 2019/0375442 A1 | 12/2019 | Wade | |

\* cited by examiner

SYSTEMS AND METHODS FOR DETECTING TANKS IN RAILWAY ENVIRONMENTS

PRIORITY

This application is a continuation under 35 U.S.C. § 120 of U.S. patent application Ser. No. 16/855,365 filed Apr. 22, 2020, which is a utility filing entitled "SYSTEMS AND METHODS FOR DETECTING TANKS IN RAILWAY ENVIRONMENTS", which is hereby incorporated by reference in its entirety.

TECHNICAL FIELD

This disclosure generally relates to detecting tanks, and more specifically to systems and methods for detecting tanks in railway environments.

BACKGROUND

Certain railway companies prohibit the storage of hazardous materials such as anhydrous ammonia on their property. Railroad inspectors may identify storage tanks that contain hazardous materials by routine property inspections. However, due to limited resources such as time and manpower, tanks storing hazardous materials on railway property may go undetected.

SUMMARY

According to an embodiment, a method includes identifying, by an image detection tool, a tank within an image of a railway environment and identifying, by the image detection tool, a railroad track within the image of the railway environment. The method also includes determining, by the image detection tool, a distance between the tank and the railroad track and comparing, by the image detection tool, the distance between the tank and the railroad track to a predetermined threshold distance. The method further includes determining, by the image detection tool, that the tank presents a hazard to the railway environment in response to comparing the distance between the tank and the railroad track to the predetermined threshold distance.

In certain embodiments, the method includes determining that the distance between the tank and the railroad track is less than or equal to the predetermined threshold distance. For example, the predetermined threshold distance may be 50 feet. In some embodiments, the method includes classifying, by the image detection tool, the hazard as a high risk, a medium risk, or a low risk based on the distance between the tank and the railroad track. For example, the high risk may be associated with distances between 0 and 20 feet, the medium risk may be associated with distances between 21 and 30 feet, and the low risk may be associated with distances between 31 and 50 feet.

In certain embodiments, the method includes generating, by the image detection tool, an alert. The alert may include at least one of the following: an indication of the hazard, an indication of a risk level associated with the hazard, a description of the tank, a location of the tank, the distance between the tank and the railroad track, the image of the railway environment, a time when the image of the railway environment was captured, and/or a date when the image of the railway environment was captured. In some embodiments, the method includes training the image detection tool to identify the tank using a machine learning model.

In certain embodiments, the image is captured by a camera attached to a train car while the train car is moving along the railroad track through the railway environment. The train car may be a locomotive or a geometry car. In some embodiments, the image includes the railroad track and one or more other railroad tracks, the railroad track is closer to the tank than the one or more other railroad tracks, and the distance between the tank and the railroad track is the shortest measured distance, in plan view, from a centerline of an outer rail of the railroad track to an outer edge of the tank.

According to another embodiment, a device includes one or more processors and a memory storing instructions that, when executed by the one or more processors, cause the one or more processors to perform operations including identifying a tank within an image of a railway environment and identifying a railroad track within the image of the railway environment. The operations also include determining a distance between the tank and the railroad track and comparing the distance between the tank and the railroad track to a predetermined threshold distance. The operations further include determining that the tank presents a hazard to the railway environment in response to comparing the distance between the tank and the railroad track to the predetermined threshold distance.

According to yet another embodiment, one or more computer-readable storage media embody instructions that, when executed by a processor, cause the processor to perform operations including identifying a tank within an image of a railway environment and identifying a railroad track within the image of the railway environment. The operations also include determining a distance between the tank and the railroad track and comparing the distance between the tank and the railroad track to a predetermined threshold distance. The operations further include determining that the tank presents a hazard to the railway environment in response to comparing the distance between the tank and the railroad track to the predetermined threshold distance.

Technical advantages of certain embodiments of this disclosure may include one or more of the following. Certain systems and methods described herein include an image recognition tool that automatically detects tanks located near railroad tracks, which increases efficiency by reducing the manpower and time required for manual inspection. The automatic detection of tanks located near railroad tracks increases safety by identifying potential hazardous materials in close proximity to railroad tracks. In certain embodiments, the automatic detection of tanks reduces environmental risks due to hazardous materials.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Figure 1:
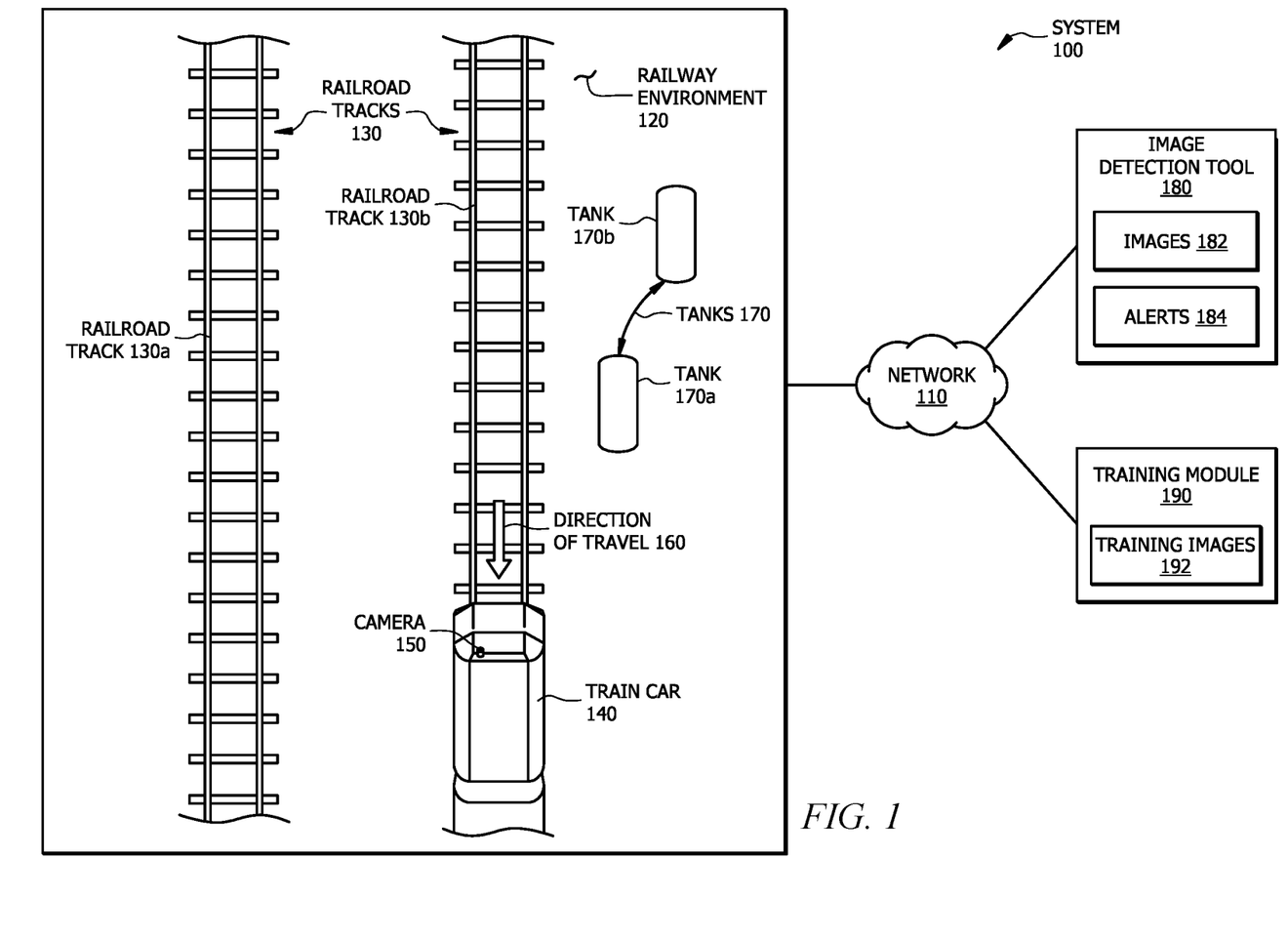
FIG. 1 illustrates an example system for detecting tanks in railway environments.
Figure 2:
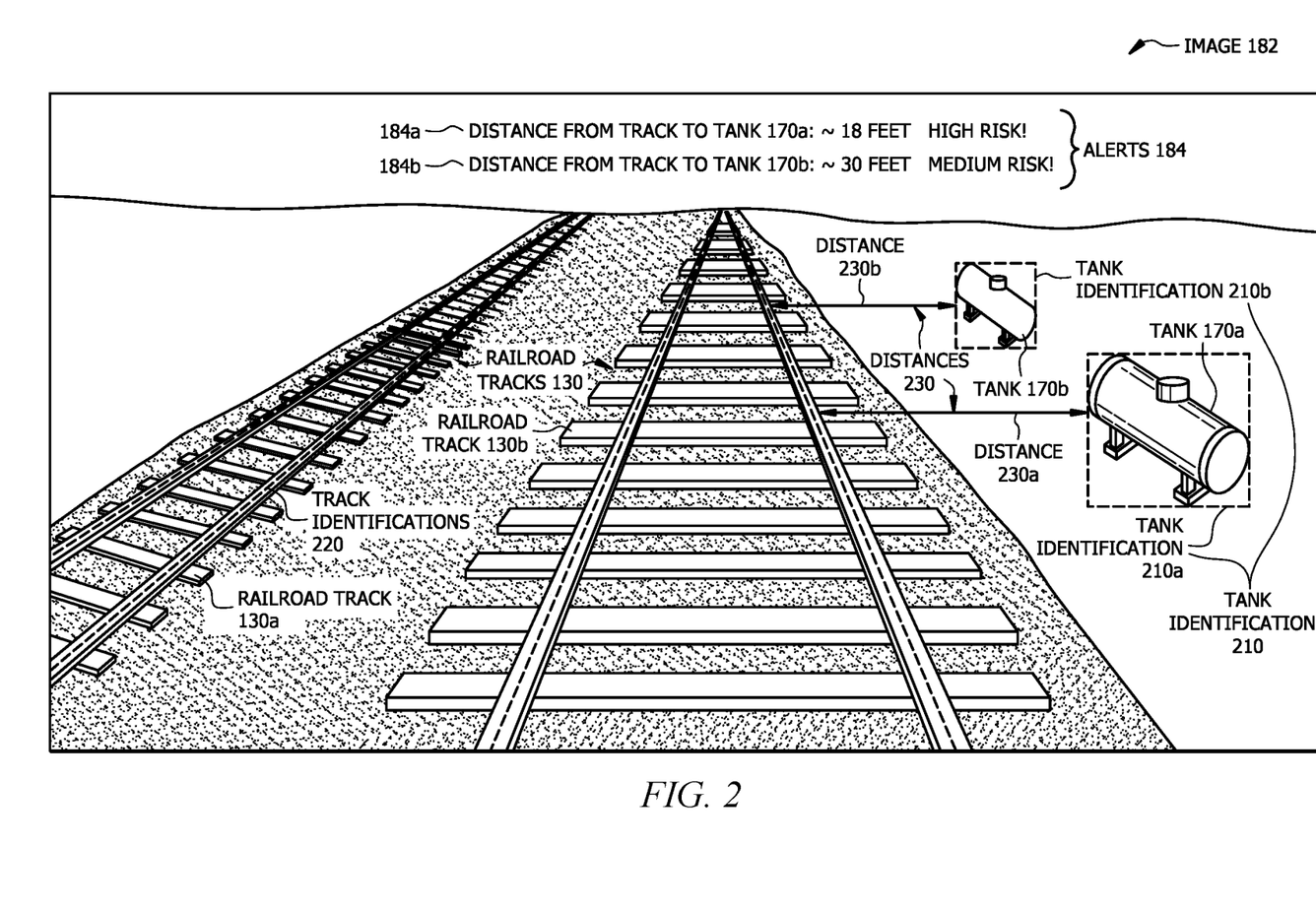
FIG. 2 illustrates an example image that may be used by the system of FIG. 1.
Figure 3:
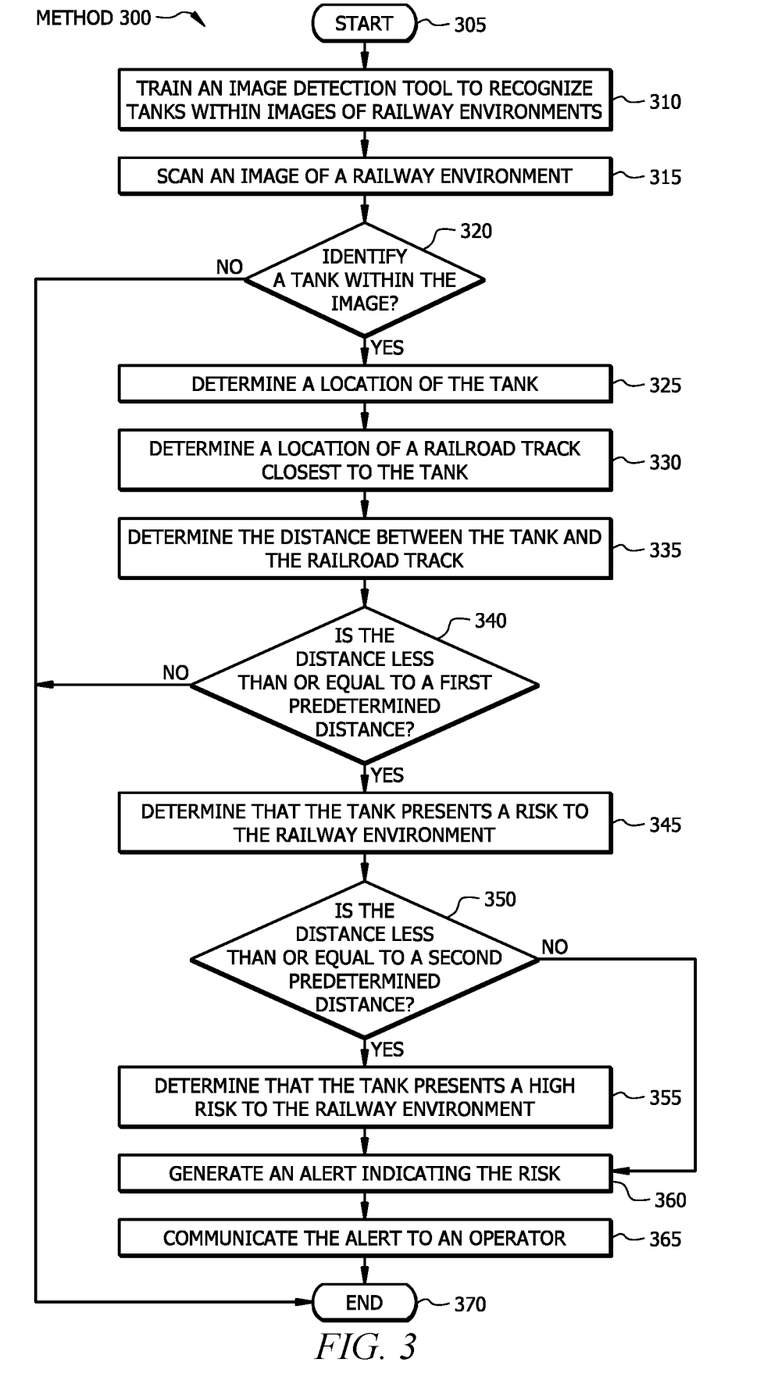
FIG. 3 illustrates an example method for detecting tanks in railway environments.
Figure 4:
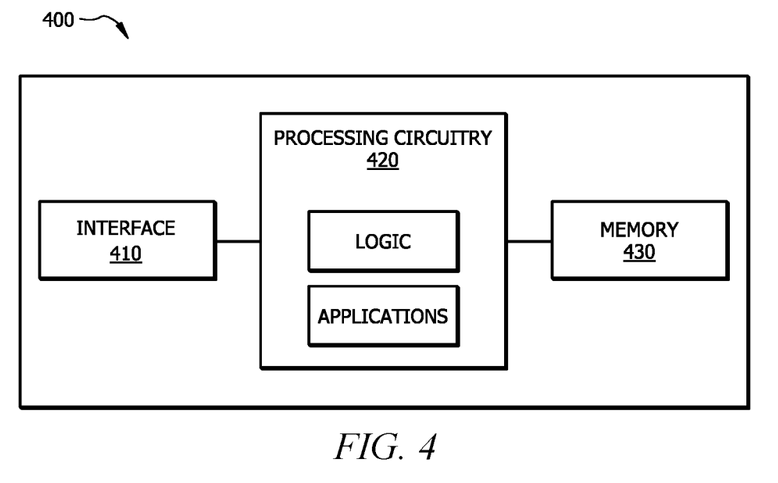
FIG. 4 illustrates an example computer system that may be used by the systems and methods described herein.

FIGS. 1 through 4 show example systems and methods for detecting tanks in railway environments. FIG. 1 shows an example system for detecting tanks in railway environments, and FIG. 2 shows an example image that may be used by the system of FIG. 1. FIG. 3 shows an example method for detecting tanks in railway environments. FIG. 4 shows an example computer system that may be used by the systems and methods described herein.

FIG. 1 illustrates an example system 100 for detecting tanks in railway environments. System 100 of FIG. 1 includes a network 110, a railway environment 120, railroad tracks 130 (i.e., railroad track 130a and railroad track 130b), a train car 140, a camera 150, an image detection tool 180, and a training module 190. System 100 or portions thereof may be associated with an entity, which may include any entity, such as a business, company (e.g., a railway company, a transportation company, etc.), or a government agency (e.g., a department of transportation, a department of public safety, etc.) that may detect tanks in railway environments. While the illustrated embodiment of FIG. 1 is associated with a railroad system, system 100 may be associated with any suitable transportation system (e.g., vehicles/roadways, vessels/waterways, and the like). For example, system 100 may be used to detect tanks in close proximity (e.g., within 50 feet) of roadways, waterways, and the like. The elements of system 100 may be implemented using any suitable combination of hardware, firmware, and software. For example, one or more components of system 100 may use one or more components of FIG. 4.

Network 110 of system 100 is any type of network that facilitates communication between components of system 100. For example, network 110 may connect camera 150 of system 100 to image detection tool 180 of system 100. As another example, network 110 may connect image detection tool 180 of system 100 to training module 190 of system 100. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 110 may include one or more access (e.g., mobile access), core, and/or edge networks. Network 110 may be any communications network, such as a private network, a public network, a connection through Internet, a mobile network, a WI-FI network, a Bluetooth network, etc. Network 110 may include cloud computing capabilities. One or more components of system 100 may communicate over network 110. For example, camera 150 may communicate over network 110, including transmitting information (e.g., images 182) to image detection tool 180 and/or receiving information (e.g., alerts) from image detection tool 180. As another example, training module 190 may communicate over network 110, including transmitting information (e.g., training images 192) to image detection tool 180.

Railway environment 120 of system 100 is an area that includes one or more railroad tracks 130. Railway environment 120 may be associated with a division, a subdivision, a district, a region, a branch, and the like. A division is the portion of the railroad under the supervision of a superintendent. A subdivision is a smaller portion of the division. The subdivision may be a crew district and/or a branch line. In the illustrated embodiment of FIG. 1, railway environment 120 includes railroad tracks 130, train car 140, camera 150, and tanks 170 (i.e., tank 170a and tank 170b).

Railroad tracks 130 of system 100 are structures that allow train cars 140 to move by providing a surface for the wheels of train cars 140 to roll upon. In certain embodiments, railroad tracks 130 include rails, fasteners, railroad ties, ballast, etc. Train car 140 is a vehicle that carries cargo and/or passengers on a rail transport system. In certain embodiments, train car 140 is coupled to other train cars to form trains. Train car 140 may be a geometry car (e.g., a track geometry car,) a locomotive, a passenger car, a freight car, a boxcar, a flatcar, a tank car, and the like.

In the illustrated embodiment of FIG. 1, train car 140 is moving in a direction of travel 160 (e.g., southbound) along railroad track 130b. In some embodiments, railroad track 130a of railway environment 120 is adjacent (e.g., parallel) to railroad track 130b of railway environment 120. In certain embodiments, train car 140 may be moving opposite the direction of travel 160 (e.g., northbound) along railroad track 130a. In some embodiments, train car 140 may be moving in direction of travel 160 (or opposite to direction of travel 160) along railroad track 130a.

Camera 150 of system 100 is a component that automatically captures still or moving images 182. Camera 150 may include one or more lenses, sensors, optics, lighting elements, etc. In certain embodiments, camera 150 provides high-resolution, 360 degrees of visual coverage. Camera 150 may capture images 182 in real-time or near real-time. For example, camera 150 may capture image 182 of an object (e.g., tank 170a and/or tank 170b) of railway environment 120 and communicate image 182 to a component (e.g., image detection tool 180 or training module 190) external to camera 150 in less than a predetermined amount of time (e.g., one, five, ten seconds, or any other suitable amount of time). In some embodiments, camera 150 tracks the time and/or date each image 182 was captured. For example, camera 150 may stamp each captured image 182 with the time and/or date that image 182 was captured.

In certain embodiments, camera 150 automatically captures images 182 of railway environment 120 of system 100. Camera 150 may automatically capture still or moving images 182 while train car 140 is moving along railroad track 130b. Camera 150 may automatically capture any suitable number of still or moving images 182. For example, camera 150 may automatically capture a predetermined number of images 182 per second, per minute, per hour, etc. In certain embodiments, camera 150 automatically captures a sufficient number of images 182 to capture the entire length of railroad track 130b within a predetermined area (e.g., a division, a subdivision, or any other suitable area).

Camera 150 of system 100 is attached to train car 140. Camera 150 may be attached to train car 140 in any suitable location that provides a clear view of railroad track 130b. For example, camera 150 may be attached to a rear end (e.g., back windshield, a roof, etc.) of train car 140 to provide a rear-facing view of railroad track 130b. As another example, camera 150 may be attached to a front end (e.g., a front windshield) of train car 140 to provide a forward-facing view of railroad track 130b.

Tanks 170 (i.e., tank 170a and tank 170b) of system 100 are storage containers that hold materials (e.g., liquids, compressed gases, chemicals, etc.) for short-term or long-term storage. In certain embodiments, tanks 170 store hazardous materials. For example, tanks 170 may store toxic and/or poison inhalations hazards (e.g., anhydrous ammonia), allyl chloride, benzene, carbon disulfide, carbon tetrachloride, chlorobenzene, chlorobenzyl chloride, chloroform, dichloropropene, epichlorohydrin, ethyl chloride, ethylene dichloride, methyl chloroform (trichloroethane), methylene chloride (dichloromethane), a methylene chloride/chloroform mixture, o-dichlorobenzene, perchloroethylene (tetrachloroethylene), a perchloroethylene/trichloroethylene mixture, trichloroethylene, flammable gases, non-flammable gases, poison gases, fuel, oil, propane, a combination thereof, or any other hazardous substance. In certain embodiments, tanks 170 are above-ground storage tanks.

Image detection tool 180 of system 100 is a component that inspects, evaluates, and/or processes still or moving images 182. Image detection tool 180 may inspect images 182 for objects. The objects may include one or more railroad tracks 130, tanks 170, power stations, power lines, road crossings, road crossing stop bars, milepost signs, speed signs, railway signals, and the like. In some embodiments, image detection tool 180 may use image detection algorithms to analyze the objects in images 182. Image detection algorithms may recognize objects in images 182 and classify the objects using image processing techniques and/or pattern recognition techniques. In certain embodiments, image detection tool 180 uses a cloud computing platform (e.g., Microsoft Azure, Amazon Web Services (AWS), etc.) to inspect, evaluate, and/or process images 182.

In certain embodiments, image detection tool 180 uses image detection algorithms to analyze the objects (e.g., tanks 170, power stations, power lines, road crossings, road crossing stop bars, milepost signs, speed signs, railway signals, etc.) in images 182 for certain characteristics (e.g., size, shape, position, etc.). For example, image detection tool 180 may determine a length of each tank 170, a width of each tank 170, a height of each tank 170 relative to ground level, a shape of each tank 170 (e.g., cylindrical), a type of roof for each tank 170 (e.g., a fixed flangible or floating roof), and the like. As another example, image detection tool 180 may determine a position (e.g., up or down) of a road crossing stop bar. In some embodiments, image detection tool 180 may classify each object based on the characteristics of each object. For example, image detection tool 180 may classify each tank 170 into one of the following classifications: anhydrous ammonia tanks, methane tanks, water tanks, and the like.

In some embodiments, image detection tool 180 may determine, based on the characteristics and/or classifications of each tank 170, whether each tank 170 contains hazardous materials. For example, image detection tool 180 may determine, based on the size and shape of tank 170a, that tank 170a contains a hazardous substance such as anhydrous ammonia. As another example, image detection tool 180 may determine, based on the size and shape of tank 170b, that tank 170b contains a nonhazardous substance, such as water. In certain embodiments, image detection tool 180 may determine, based at least in part on the characteristics and/or classifications of each tank 170, whether each tank 170 presents a hazard to railway environment 120.

In some embodiments, image detection tool 180 determines a location of one or more objects using image 182. The location may represent a physical (e.g., geographical) location within railway environment 120. For example, image detection tool 180 may determine a geographical location (e.g., Global Positioning System (GPS) coordinates) of an object (e.g., railroad track 130a, railroad track 130b, tank 170a, 170b, etc.) using image 182. The location may represent any point (e.g., a center or an edge) within the area, in plan view, of the object.

In some embodiments, image detection tool 180 determines a location of an object in image 182 relative to another object in image 182. For example, image detection tool 180 may determine a distance between the location of a first object (e.g., railroad track 130b) of image 182 and the location of a second object (e.g., tank 170a) of image 182. The distance between the two objects may represent a physical (e.g., geographical) distance in railway environment 120. For example, image detection tool 180 may use image 182 to determine that the distance between railroad track 130b and tank 170a of railway environment 120 is 20 feet. In certain embodiments, the distance is measured, in plan view, from the edge of tank 170a closest to railroad track 130b to the centerline of railroad track 130b. In some embodiments, the distance is measured, in plan view, from the edge of tank 170a closest to railroad track 130b to the centerline of railroad track 130b. The distance between railroad track 130b and each tank 170 may represent the shortest distance, in plan view, between the centerline of railroad track 130b (or the centerline of an outer rail of railroad track 130b) and each respective tank 170.

In some embodiments, image detection tool 180 compares the distance between railroad track 130b and each tank 170 of railway environment 120 to a predetermined threshold distance to determine whether each tank 170 presents a hazard to railway environment 120. Tank 170a presents a hazard to railway environment 120 if tank 170a is located within the predetermined threshold distance to railroad track 130b. In certain embodiments, the predetermined threshold distance is 50 feet. For example, image detection tool 180 may determine that the geographical distance between the centerline of railroad track 130b and tank 170a is less than or equal to the predetermined threshold distance of 50 feet and determine, based on the comparison, that tank 170 presents a hazard to railway environment 120.

In certain embodiments, each hazard is classified according to a risk level. The risk level is the chance of the hazard actually causing harm to railway environment 120. The risk levels may include a high risk level, a medium risk level, a low risk level, or any other representative level that identifies the potential risk. In some embodiments, different predetermined threshold distances are associated with the different risk levels. For example, a threshold distance between 0 and 20 feet may be associated with a high risk level, a threshold distance between 21 and 30 feet may be associated with a medium risk level, and a threshold distance between 31 feet and 50 feet may be associated with a low risk level. As another example, a threshold distance between 0 and 25 feet may be associated with a high risk level, a threshold distance between 26 and 35 feet may be associated with a medium risk level, and a threshold distance between 36 feet and 55 feet may be associated with a low risk level. As still another example, a threshold distance between 0 and 15 feet may be associated with a high risk level, a threshold distance between 16 and 25 feet may be associated with a medium risk level, and a threshold distance between 26 feet and 40 feet may be associated with a low risk level. Image detection tool 180 may generate one or more alerts 184 in response to determining that tank 170a and/or tank 170b presents a hazard/risk to railway environment 120.

Image detection tool 180 may communicate one or more alerts 184 to one or more components of system 100. Each alert 184 represents a notice of a hazard to railway environment 120. Alerts 184 may be communicated in any suitable format (e.g., an email, a voicemail, a fax, a text message, a post to a website, etc.). In certain embodiments, image detection tool 180 communicates one or more alerts 184 to an operator (e.g., an administrator, an engineer, a superintendent, etc.). For example, image detection tool 180 may determine that tank 170a presents a high risk to railway environment 120 and communicate alert 184 indicating the high risk to one or more operators and/or components of system 100. As another example, image detection tool 180 may determine that tank 170b presents a medium risk to railway environment 120 and communicate alert 184 indicating the medium risk to one or more operators and/or components of system 100. In certain embodiments, alerts 184 may be communicated to a network operations center.

In certain embodiments, alerts 184 generated by image detection tool 180 may include one or more of the following: a description of one or more tanks 170 located within the risk zone (e.g., within 50 feet) of railroad track 130b, the distance between railroad track 130b and one or more tanks 170, image 184 of tanks 170, the locations of tanks 170 (e.g., GPS locations of tanks 170), a time when tanks 170 were captured by camera 150 of train car 140, a date when tanks 170 were captured by camera 150 of train car 140, an identification of train car 140, an indication of direction of travel 160 of train car 140, and the like.

In some embodiments, the information generated by system 100 may be combined with information generated by one or more other systems (e.g., a real estate system, a geographic information system (GIS), etc.). For example, information (e.g., tank identifications, tank locations, etc.) generated by image detection tool 180 of system 100 may be combined with information (e.g., land ownership, contract agreements, etc.) generated by a real estate system and or information (e.g., digitized map views) generated by a GIS. In certain embodiments, one or more components of system 100 may generate a report that includes the combined and/or compared information. The report may provide a comprehensive view of railway environment 120.

Training module 190 of system 100 is an application that trains one or more models to detect objects (e.g., tanks 170, power stations, power lines, road crossings, road crossing stop bars, milepost signs, speed signs, railway signals, etc.). For example, training module 190 may train a one or more models to detect objects of interest (e.g., tanks 170, power stations, power lines, road crossings, road crossing stop bars, milepost signs, speed signs, railway signals, etc.) in images 182 (e.g., digital images, videos, etc.). Training module 190 may use training images 192 to train the one or more models to detect objects of interest. Training images 192 are images that include the objects of interest. For example, training images 192 may include images of tanks 170 in railway environment 120. In certain embodiments, the objects of interest (e.g., tanks 170) are superimposed onto training images 192. For example, existing images of tanks 170 may be pasted into images 182 that include railroad tracks 130. In certain embodiments, training module 190 receives training images 192 from an administrator of system 100. The amount and variety of training images 192 utilized by training module 190 depends on the desired accuracy, the number of classifications of tanks 170, the availability of training images 192 for each classification, and the like.

In certain embodiments, training module 190 uses one or more machine learning approaches to train the models. Machine learning approaches use algorithms to analyze data, learn from the data, and make informed decisions based on the learned information. Machine learning approaches may include one or more of the following: Viola-Jones object detection framework, scale-invariant feature transform (SIFT), histogram of oriented gradients (HOG) features, and the like. Certain machine learning approaches include deep learning approaches. Deep learning approaches may learn unsupervised data that is unstructured or unlabeled. Deep learning approaches may include one or more of the following: You Only Look Once (YOLO), Region Proposals (e.g., R-CNN, Fast R-CNN, Faster R-CNN, etc.), Single Shot MultiBox Detector (SSD), Single-Shot Refinement Neural Network for Object Detection (RefineDet), Retina-Net, deformable convolutional networks, and the like.

In operation, training module 190 of system 100 trains image detection tool 180 to identify tanks 170 in images 182. Camera 150 is attached to train car 140 (e.g., a locomotive or a geometry car) and captures images 182 of railway environment 120 while train car 140 is moving in the direction of travel 160 along railroad track 130b. Camera 150 communicates image 182 to image detection tool 180. Image detection tool 180 scans image 182 and identifies tank 170a and tank 170b within image 182. Image detection tool 180 identifies railroad track 130b within image 182 and determines a first distance (e.g., 18 feet) between tank 170a and railroad track 130b and a second distance (e.g., 30 feet) between tank 170b and railroad track 130b. Image detection tool 180 compares the first and second distances to a predetermined threshold distance (e.g., 50 feet) and determines that the first and second distances are less than the predetermined threshold distance. Based on these determinations, image detection tool 180 determines that tank 170a and tank 170b present hazards to railway environment 120. Image detection tool classifies the hazards as low risk, medium risk, or high risk and generates alerts 184 indicating the hazards and associated risk levels. As such, system 100 may be used to alert one or more individuals of hazards in railway environments 120 due to tanks 170 being located in close proximity (e.g., within 50 feet) of railroad tracks, which may initiate corrective action that reduces or eliminates the hazards.

Although FIG. 1 illustrates a particular arrangement of network 110, railway environment 120, railroad tracks 130, train car 140, camera 150, tanks 170, image detection tool 180, and training module 190, this disclosure contemplates any suitable arrangement of network 110, railway environment 120, railroad tracks 130, train car 140, camera 150, tanks 170, image detection tool 180, and training module 190. For example, tank 170b may be located closer to railroad track 130b than tank 170a. As another example, train car 140 may be traveling along railroad track 130a instead of railroad track 130b. As still another example, train car 140 may be traveling in a direction of travel opposite to direction of travel 160. As yet another example, image detection tool 180 and training module 190 may be combined into one component.

Although FIG. 1 illustrates a particular number of networks 110, railway environments 120, railroad tracks 130, train cars 140, cameras 150, tanks 170, image detection tools 180, and training modules 190, this disclosure contemplates any suitable number of networks 110, railway environments 120, railroad tracks 130, train cars 140, cameras 150, tanks 170, image detection tools 180, and training modules 190. For example, system 100 may include more or less than two railroad tracks 130. As another example, system 100 may include more or less than two tanks 170.

FIG. 2 illustrates an example image 182 that may be used by system 100 of FIG. 1. Image 182 shows an overview of railway environment 120 of FIG. 1 at a particular moment in time. Image 182 includes railroad tracks 130 (i.e., railroad track 130a and railroad track 130b), tank 170a, and tank 170b. In the illustrated embodiment of FIG. 2, railroad track 130a is adjacent (e.g., parallel) to railroad track 130b. In certain embodiments, camera 150 of FIG. 1 automatically captures image 182 as train car 140 moves through railway environment 120 along railroad track 130b.

Image 182 of FIG. 2 includes multiple labels. In some embodiments, image detection tool 180 of FIG. 1 generates one or more labels for image 182. The labels represent information associated with image 182. For example, image detection tool 180 may generate one or more labels for image 182 that identify one or more objects (e.g., railroad track 130a, railroad track 130b, tank 170a, tank 170b, etc.). As another example, image detection tool 180 may generate one or more labels for image 182 that identify one or more hazards associated with the railway environment depicted in image 182. In certain embodiments, the labels identify the level of risk associated with the hazard (e.g., a high risk, a medium risk, a low risk, etc.). As still another example, image detection tool 180 may generate one or more labels for image 182 that provide additional information for image 182. The additional information may include a description of an object (e.g., tank 170a, tank 170b, etc.), a location of the object (e.g., a GPS location, a mile marker near the object, etc.), a distance between objects, a time when image 182 of the railway environment was captured, a date when image 182 of the railway environment was captured, and the like. In some embodiments, one or more labels are superimposed on image 182. In the illustrated embodiment of FIG. 2, the labels include tank identifications 210, track identifications 220, distances 230, and alerts 184.

Tank identifications 210 (i.e., tank identification 210a and tank identification 210b) of image 182 are labels used to identify tanks within image 182. While tank identifications 210 are represented as dashed boxes in the illustrated embodiment of FIG. 2, tank identifications 210 may be represented in any suitable manner. For example, tank identifications 210 may be represented as solid boxes, highlighted areas, letters, numbers, a combination thereof, and the like. In certain embodiments, image detection tool 180 of FIG. 1 identifies tank 170a within image 182 and labels tank 170a with tank identification 210a. Similarly, image detection tool 180 may identify tank 170b within image 182 and label tank 170b with tank identification 210b. Tank identification 210a of image 182 represents an outer perimeter, in plan view, of tank 170a. Tank identification 210b of image 182 represents an outer perimeter, in plan view, of tank 170b.

Track identifications 220 of image 182 are labels used to identify railroad tracks within image 182. While track identifications 220 are represented as dashed lines in the illustrated embodiment of FIG. 2, track identifications 220 may be represented in any suitable manner. For example, track identifications 220 may be represented as solid lines, bold lines, highlighted areas, letters, numbers, a combination thereof, and the like. In certain embodiments, image detection tool 180 of FIG. 1 identifies railroad track 130a and railroad track 130b within image 182 and labels railroad track 130a and railroad track 130b with track identifications 220. Each track identification 220 of image 182 represents a centerline of a rail. For example, the two dashed lines along railroad track 130a of image 182 represent the centerlines of the inner and outer rails for railroad track 130a. As another example, the two dashed lines along railroad track 130b of image 182 represent the centerlines of the inner and outer rails for railroad track 130b.

Distances 230 of image 182 are labels used to represent distances between tanks 170 and railroad tracks 130. While distances 230 are represented as solid lines with arrows at each end in the illustrated embodiment of FIG. 2, distances 230 may be represented in any suitable manner. For example, distances 230 may be represented as dashed lines with arrows at each end, solid lines with tick marks at each end, bold lines, letters, numbers, a combination thereof, and the like. In certain embodiments, distance 230a between tank 170a and railroad track 130b is the shortest measured distance, in plan view, from a centerline of an outer rail of railroad track 130b to an outer edge of tank 170a. In some embodiments, distance 230b between tank 170b and railroad track 130b is the shortest measured distance, in plan view, from a centerline of an outer rail of railroad track 130b to an outer edge of tank 170b. Distances 230 of image 182 represent the actual (e.g., geographical) distances between tanks 170 and railroad tracks. Distances 230 may be represented using metric units (e.g., meters, centimeters, etc.), standard units (e.g., feet, inches, etc.), and the like. In certain embodiments, distances 230 may be approximate (e.g., within 3 percent, 5 percent, or 10 percent) to the actual field measured distances.

Alerts 184 of image 182 are labels used to identify hazards within image 182. In the illustrated embodiment of FIG. 2, alerts 184 include a high risk alert 184a associated with tank 170a and a medium risk alert 184b associated with tank 170b. In certain embodiments, image detection tool 180 of FIG. 1 generates alerts 184 in response to comparing distances 230 to one or more predetermined threshold distances. For example, image detection tool 180 may compare distance 230a (e.g., 18 feet) between tank 170a and railroad track 130b to a first predetermined threshold distance (e.g., 50 feet) to determine that tank 170a presents a hazard to the railway environment. Similarly, image detection tool 180 may compare distance 230b (e.g., 30 feet) between tank 170b and railroad track 130b to the first predetermined threshold distance (e.g., 50 feet) to determine that tank 170b presents a hazard to the railway environment. As another example, image detection tool 180 may compare distance 230a (e.g., 18 feet) between tank 170a and railroad track 130b to a second predetermined threshold distance (e.g., 20 feet) to determine that tank 170a presents a high risk to the railway environment. Similarly, image detection tool 180 may compare distance 230b (e.g., 30 feet) between tank 170b and railroad track 130b to the second predetermined threshold distance (e.g., 20 feet) to determine that tank 170a presents a medium risk to the railway environment.

In response to these determinations, image detection tool 180 may generate alerts 184 to inform one or more individuals (e.g., an administrator, an engineer, etc.) of the hazards and/or risk levels. While alerts 184 are represented as a combination of letters, numbers, and symbols in the illustrated embodiment of FIG. 2, alerts 184 may be represented in any suitable manner. For example, alert 184a may identify tank 170a as a high risk by placing a red box around tank 170a. As another example, alert 184b may identify tank 170b as a medium risk by placing an orange box around tank 170b.

Although FIG. 2 illustrates a particular arrangement of railroad tracks 130, tanks 170, tank identifications 210, track identifications 220, distances 230, and alerts 184 within image 182, this disclosure contemplates any suitable arrangement of railroad tracks 130, tanks 170, tank identifications 210, track identifications 220, distances 230, and alerts 184 within image 182. For example, tank 170*a* and/or tank 170*b* may be located closer to railroad track 130*a* than to railroad track 130*b*. As another example, track identification 220 may represent a centerline of railroad track 130*a* rather than a centerline of a rail of railroad track 130*a*. As still another example, alerts 184 may be positioned near the bottom, in plan view, of image 184 rather than near the top, in plan view, of image 184.

Although FIG. 2 illustrates a particular number of railroad tracks 130, tanks 170, tank identifications 210, track identifications 220, distances 230, and alerts 184 within image 182, this disclosure contemplates any suitable number of railroad tracks 130, tanks 170, tank identifications 210, track identifications 220, distances 230, and alerts 184 within image 182. For example, image 182 may include more or less than two tanks 170. As another example, image 182 may include more or less than two alerts 184. While image 182 of FIG. 2 is associated with a railroad system, image 182 may be associated with any suitable transportation system (e.g., vehicles/roadways, vessels/waterways, and the like).

FIG. 3 illustrates an example method 300 for detecting tanks in railway environments. Method 300 begins at step 305. At step 310, a training module (e.g., training module 190 of FIG. 1) trains an image detection tool (e.g., image detection tool 180 of FIG. 1) to identify tanks in railway environments (e.g., tanks 170 in railway environment 120 of FIG. 1). In certain embodiments, the training module uses training images (e.g., training images 192 of FIG. 1) to train the image detection tool to detect the tanks. The training module may use a deep learning approach and/or a machine learning approach to train the image detection tool to detect the tanks. Method 300 then moves from step 310 to step 315.

At step 315 of method 300, the image detection tool scans an image (e.g., image 182 of FIG. 2) of a railway environment. The image may be captured by a camera (e.g., camera 150 of FIG. 1) attached to a train car (e.g., train car 140 of FIG. 1) while the train car is moving along a railroad track (e.g., railroad track 130*b* of FIG. 1) in the railway environment. In certain embodiments, the image detection tool receives the image from the camera. Method 300 then moves from step 315 to step 320.

At step 320 of method 300, the image detection tool determines whether the image includes one or more tanks. If the image detection tool does not identify a tank within the image, method 300 advances from step 320 to step 370, where method 300 ends. If, at step 320, the image detection tool identifies a tank within the image, method 300 moves from step 320 to step 325, where the image detection tool determines a location of the tank. The location of the tank may be a location of the tank within the image, a physical location (e.g., a GPS location), a location of the tank relative to one or more other objects in the image, etc. In certain embodiments, the determined location of the tank is approximate (e.g., within ten percent) to the actual, physical location of the tank. Method 300 then moves from step 325 to step 330.

At step 330 of method 300, the image detection tool determines a location of the railroad track within the image that is closest to the tank. For example, the image detection tool may determine the location of the centerline of the outer rail of the railroad track (e.g., railroad track 130*b* of FIG. 2) that is closest to the tank. As another example, the image detection tool may determine the location of the centerline of the railroad track that is closest to the tank. In certain embodiments, the determined location of the railroad track is approximate (e.g., within ten percent) to the actual, physical location of the railroad track. Method 300 then moves from step 330 to step 335.

At step 335 of method 300, the image detection tool determines a distance between the tank and the railroad track. For example, the image detection tool may determine a physical distance (e.g., 18 feet) between an outer perimeter, in plan view, of the tank and the centerline of the outer rail of the closest railroad track. As another example, the image detection tool may determine a physical distance (e.g., 20 feet) between an outer perimeter, in plan view, of the tank and the centerline of the closest railroad track. Method 300 then moves from step 335 to step 340.

At step 340 of method 300, the image detection tool determines whether the distance between the tank and the railroad track is less than or equal to a first predetermined distance (e.g., 50 feet). If the image detection tool determines that the distance between the tank and the railroad track is greater than the first predetermined distance, method 300 advances from step 340 to step 370, where method 300 ends. If, at step 340, the image detection tool determines that the distance between the tank and the railroad track is less than or equal to the first predetermined distance, method 300 moves from step 340 to step 345, where the image detection tool determines that the tank presents a risk to the railway environment. Method 300 then moves from step 345 to step 350.

At step 350 of method 300, the image detection tool determines whether the distance between the tank and the railroad track is less than or equal to a second predetermined distance (e.g., 20 feet). If the image detection tool determines that the distance between the tank and the railroad track is greater than the second predetermined distance, method 300 advances from step 350 to step 360. If, at step 350, the image detection tool determines that the distance between the tank and the railroad track is less than or equal to the second predetermined distance, method 300 moves from step 350 to step 355, where the image detection tool determines that the tank presents a high risk to the railway environment. Method 300 then moves from step 355 to step 360.

At step 360 of method 300, the image detection tool generates an alert (e.g., alert 184*a* or alert 184*b* of FIG. 2) indicating the risk. For example, the image detection tool may generate an alert indicating that the tank presents a risk (e.g., a low risk or a medium risk) to the railway environment if the distance between the tank and the railroad track is less than or equal to the first predetermined threshold (e.g., 50 feet) but greater than the second predetermined threshold (e.g., 20 feet). As another example, the image detection tool may generate an alert indicating that the tank presents a high risk to the railway environment if the distance between the tank and the railroad track is less than or equal to the second predetermined threshold (e.g., 20 feet). Method 300 then moves from step 360 to step 365, where the image detection tool communicates the alert to an operator (e.g., an administrator, an engineer, etc.). Method 300 then moves from step 365 to step 370, where method 300 ends.

Modifications, additions, or omissions may be made to method 300 depicted in FIG. 3. Method 300 may include more, fewer, or other steps. For example, method 300 may include additional steps directed to determining whether the tank presents a low risk or a medium risk to the railway environment. As another example, method 300 may include one or more additional steps directed to identifying a second tank within the image and determining whether the second tank presents a risk to the railway environment. As still another example, method 300 may include one or more steps directed to determining characteristics (e.g., size, shape, etc.) of the tank and determining, based on the characteristics, whether the tank contains hazardous materials. One or more steps of method 400 may be performed in real-time.

Method 300 may be associated with any suitable transportation system (e.g., vehicles/roadways, vessels/waterways, and the like). Steps of method 300 may be performed in parallel or in any suitable order. While discussed as specific components completing the steps of method 300, any suitable component may perform any step of method 300. For example, one or more steps of method 300 may be automated using one or more components of the computer system of FIG. 4. In certain embodiments, one or more steps of method 300 is determined using a machine learning approach (e.g., YOLO).

FIG. 4 shows an example computer system that may be used by the systems and methods described herein. For example, network 110, camera 150, image detection tool 180, and/or training module 190 of FIG. 1 may include one or more interface(s) 410, processing circuitry 420, memory(ies) 430, and/or other suitable element(s). Interface 410 receives input, sends output, processes the input and/or output, and/or performs other suitable operation. Interface 410 may comprise hardware and/or software.

Processing circuitry 420 performs or manages the operations of the component. Processing circuitry 420 may include hardware and/or software. Examples of a processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 (e.g., memory 124 of FIG. 1) may comprise one or more non-transitory, tangible, computer-readable, and/or computer-executable storage media. Examples of memory 430 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   determining, by an image detection tool, a plurality of tank classifications, wherein the plurality of tank classifications comprises:
      a first tank classification associated with a tank containing a hazardous material; and
      a second tank classification associated with a tank containing a nonhazardous material;
   identifying, by the image detection tool, a tank within an image of a railway environment;
   analyzing, by the image detection tool, the tank to determine one or more characteristics associated with the tank;
   classifying, by the image detection tool, the tank into the first tank classification based on the one or more characteristics;
   determining, by the image detection tool, that the tank contains the hazardous material and that the tank presents a hazard to the railway environment based on classifying the tank into the first tank classification; and
   generating, by the image detection tool, an alert in response to determining that the tank presents the hazard to the railway environment.

2. The method of claim 1, further comprising:
   determining, by the image detection tool, a distance between the tank and a railroad track; and
   determining, by the image detection tool, that the distance between the tank and a railroad track is less than or equal to a predetermined threshold distance, wherein the predetermined threshold distance is 50 feet.

3. The method of claim 1, further comprising classifying, by the image detection tool, the hazard as a high risk, a medium risk, or a low risk.

4. The method of claim 1, wherein the image is captured by a camera attached to a train car moving along a railroad track through the railway environment.

5. The method of claim 1, further comprising training the image detection tool to identify the tank using a machine learning model.

6. The method of claim 1, wherein the one or more characteristics comprise one or more of the following:
 a length of the tank;
 a width of the tank;
 a height of the tank relative to ground level;
 a shape of the tank; and
 a type of roof for the tank.

7. The method of claim 1, wherein the alert comprises at least one of the following:
 an indication of the hazard;
 an indication of a risk level associated with the hazard;
 a description of the tank;
 a location of the tank;
 the image of the railway environment;
 a time when the image of the railway environment was captured; and
 a date when the image of the railway environment was captured.

8. A device comprising one or more processors and a memory storing instructions that, when executed by the one or more processors, cause the one or more processors to perform operations comprising:
 determining a plurality of tank classifications, wherein the plurality of tank classifications comprises:
 a first tank classification associated with a tank containing a hazardous material; and
 a second tank classification associated with a tank containing a nonhazardous material;
 identifying a tank within an image of a railway environment;
 analyzing the tank to determine one or more characteristics associated with the tank;
 classifying the tank into the first tank classification based on the one or more characteristics;
 determining that the tank contains the hazardous material and that the tank presents a hazard to the railway environment based on classifying the tank into the first tank classification; and
 generating an alert in response to determining that the tank presents the hazard to the railway environment.

9. The system of claim 8, the operations further comprising:
 determining a distance between the tank and a railroad track; and
 determining that the distance between the tank and a railroad track is less than or equal to a predetermined threshold distance, wherein the predetermined threshold distance is 50 feet.

10. The system of claim 8, the operations further comprising classifying the hazard as a high risk, a medium risk, or a low risk.

11. The system of claim 8, wherein the image is captured by a camera attached to a train car moving along a railroad track through the railway environment.

12. The system of claim 8, the operations further comprising training an image detection tool to identify the tank using a machine learning model.

13. The system of claim 8, wherein the one or more characteristics comprise one or more of the following:
 a length of the tank;
 a width of the tank;
 a height of the tank relative to ground level;
 a shape of the tank; and
 a type of roof for the tank.

14. The system of claim 8, wherein the alert comprises at least one of the following:
 an indication of the hazard;
 an indication of a risk level associated with the hazard;
 a description of the tank;
 a location of the tank;
 the image of the railway environment;
 a time when the image of the railway environment was captured; and
 a date when the image of the railway environment was captured.

15. One or more non-transitory computer-readable storage media embodying instructions that, when executed by a processor, cause the processor to perform operations comprising:
 determining a plurality of tank classifications, wherein the plurality of tank classifications comprises:
 a first tank classification associated with a tank containing a hazardous material; and
 a second tank classification associated with a tank containing a nonhazardous material;
 identifying a tank within an image of a railway environment;
 analyzing the tank to determine one or more characteristics associated with the tank;
 classifying the tank into the first tank classification based on the one or more characteristics;
 determining that the tank contains the hazardous material and that the tank presents a hazard to the railway environment based on classifying the tank into the first tank classification; and
 generating an alert in response to determining that the tank presents the hazard to the railway environment.

16. The one or more non-transitory computer-readable storage media of claim 15, the operations further comprising:
 determining a distance between the tank and a railroad track; and
 determining that the distance between the tank and a railroad track is less than or equal to a predetermined threshold distance,
 wherein the predetermined threshold distance is 50 feet.

17. The one or more non-transitory computer-readable storage media of claim 15, the operations further comprising classifying the hazard as a high risk, a medium risk, or a low risk.

18. The one or more non-transitory computer-readable storage media of claim 15, wherein the image is captured by a camera attached to a train car moving along a railroad track through the railway environment.

19. The one or more non-transitory computer-readable storage media of claim 15, the operations further comprising training an image detection tool to identify the tank using a machine learning model.

20. The one or more non-transitory computer-readable storage media of claim 15, wherein the one or more characteristics comprise one or more of the following:
 a length of the tank;
 a width of the tank;

a height of the tank relative to ground level;
a shape of the tank; and
a type of roof for the tank.

\* \* \* \* \*